US008585332B2

(12) United States Patent
Luepke et al.

(10) Patent No.: US 8,585,332 B2
(45) Date of Patent: Nov. 19, 2013

(54) LINEAR COMPENSATOR TOOL FOR DRILL COUNTERSINKING AND SEAL GROOVE MACHINING

(75) Inventors: Richard A. Luepke, Forth Worth, TX (US); Jamie M. Smith, Keller, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 1225 days.

(21) Appl. No.: 12/183,892

(22) Filed: Jul. 31, 2008

(65) Prior Publication Data

US 2010/0028097 A1  Feb. 4, 2010

(51) Int. Cl.
*B23B 49/00* (2006.01)

(52) U.S. Cl.
USPC ............ 408/1 R; 408/97; 408/112; 408/202

(58) Field of Classification Search
USPC ...... 408/1 R, 95, 97, 110, 112, 113, 141, 202
See application file for complete search history.

(56) References Cited

U.S. PATENT DOCUMENTS

| 2,744,329 A | 5/1956 | Way |
| 2,810,960 A | 10/1957 | Johnson |
| 3,384,965 A | 5/1968 | Sicking |
| 3,836,278 A | 9/1974 | McInnes |
| 4,273,481 A * | 6/1981 | Corley et al. ............ 408/14 |
| 4,530,625 A * | 7/1985 | Corley et al. ............ 408/14 |
| 4,560,309 A | 12/1985 | Hornsby |
| 4,778,313 A | 10/1988 | Lehmkuhl |
| 4,784,541 A | 11/1988 | Umehara et al. |
| 5,277,526 A * | 1/1994 | Corsi ............................ 408/97 |
| 5,395,187 A * | 3/1995 | Slesinski et al. ............ 408/1 R |
| 6,480,757 B1 | 11/2002 | Susnjara |
| 6,722,447 B2 * | 4/2004 | Stepan et al. ................ 408/97 |
| 6,758,640 B2 | 7/2004 | Mizutani et al. |
| 6,761,516 B2 | 7/2004 | Pham |
| 6,821,064 B2 | 11/2004 | Hirabayashi |
| 6,916,229 B2 | 7/2005 | Kao et al. |
| 6,942,436 B2 | 9/2005 | Kakino et al. |
| 7,252,464 B2 * | 8/2007 | Goth et al. ................ 408/130 |
| 2003/0039524 A1 | 2/2003 | Pentz |
| 2004/0060180 A1 | 4/2004 | Nelson |
| 2007/0179661 A1 | 8/2007 | Onozuka et al. |

FOREIGN PATENT DOCUMENTS

| EP | 1724070 A1 | 11/2006 | |
| JP | 09207012 A * | 8/1997 | ............ B23B 41/00 |

* cited by examiner

*Primary Examiner* — Daniel Howell
*Assistant Examiner* — Michael Vitale
(74) *Attorney, Agent, or Firm* — Bracewell & Giuliani LLP

(57) ABSTRACT

A drill countersinking and seal groove machining tool to accommodate an accurate drill countersinking and seal groove machining operation. The linear compensator tool applies sufficient force to react to the drilling or seal groove machining process, but not so much force as to distort the work piece being drilled or machined. The tool ensures that the reactant force does not exceed the machine force override allowances. Varying spring rates and/or air pressures on the linear compensator system will accommodate most applications. The tool absorbs over travel of the machining tool, in order to ensure that the surface to be machined is always in contact with the machining tool.

15 Claims, 10 Drawing Sheets

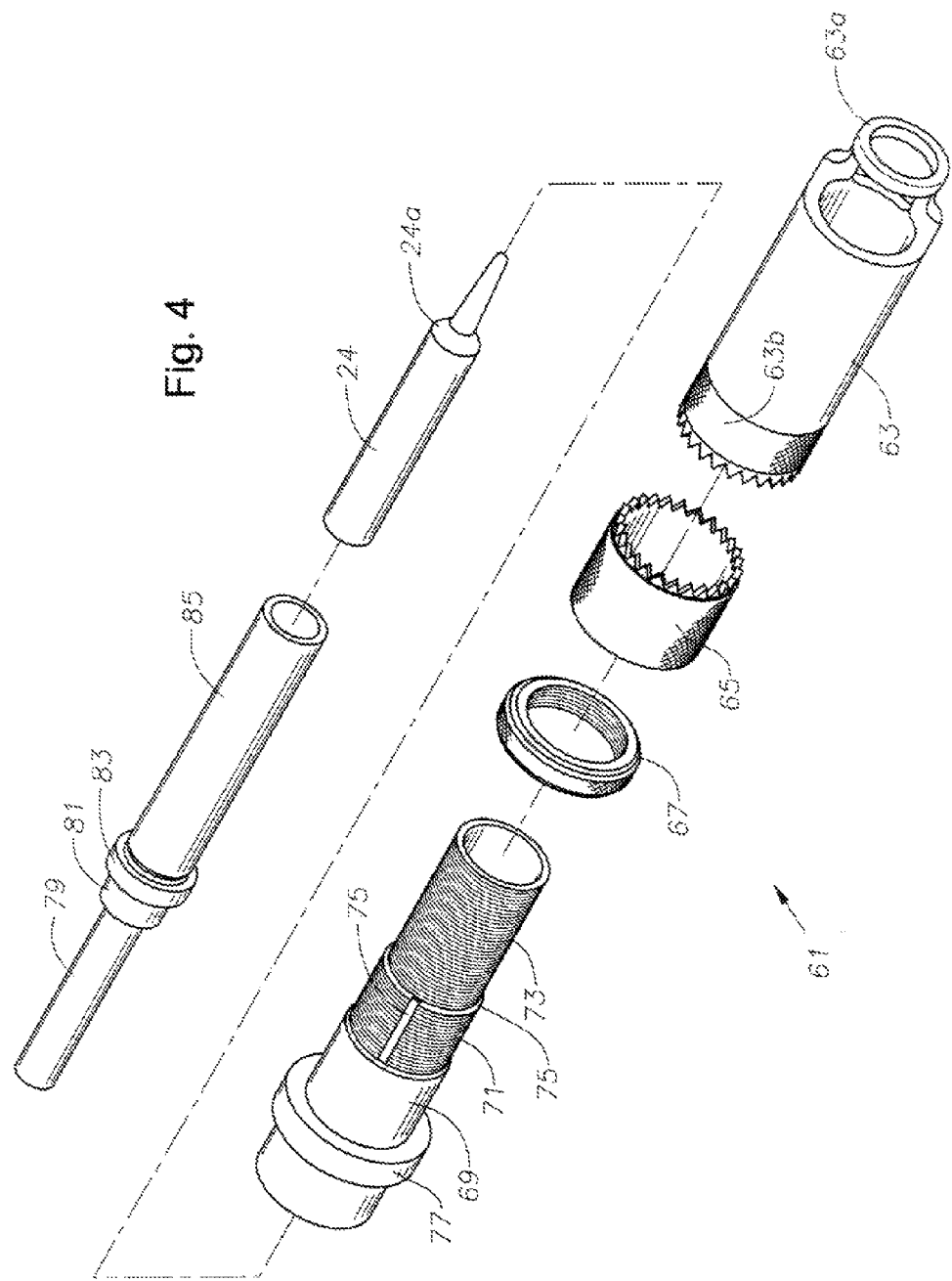

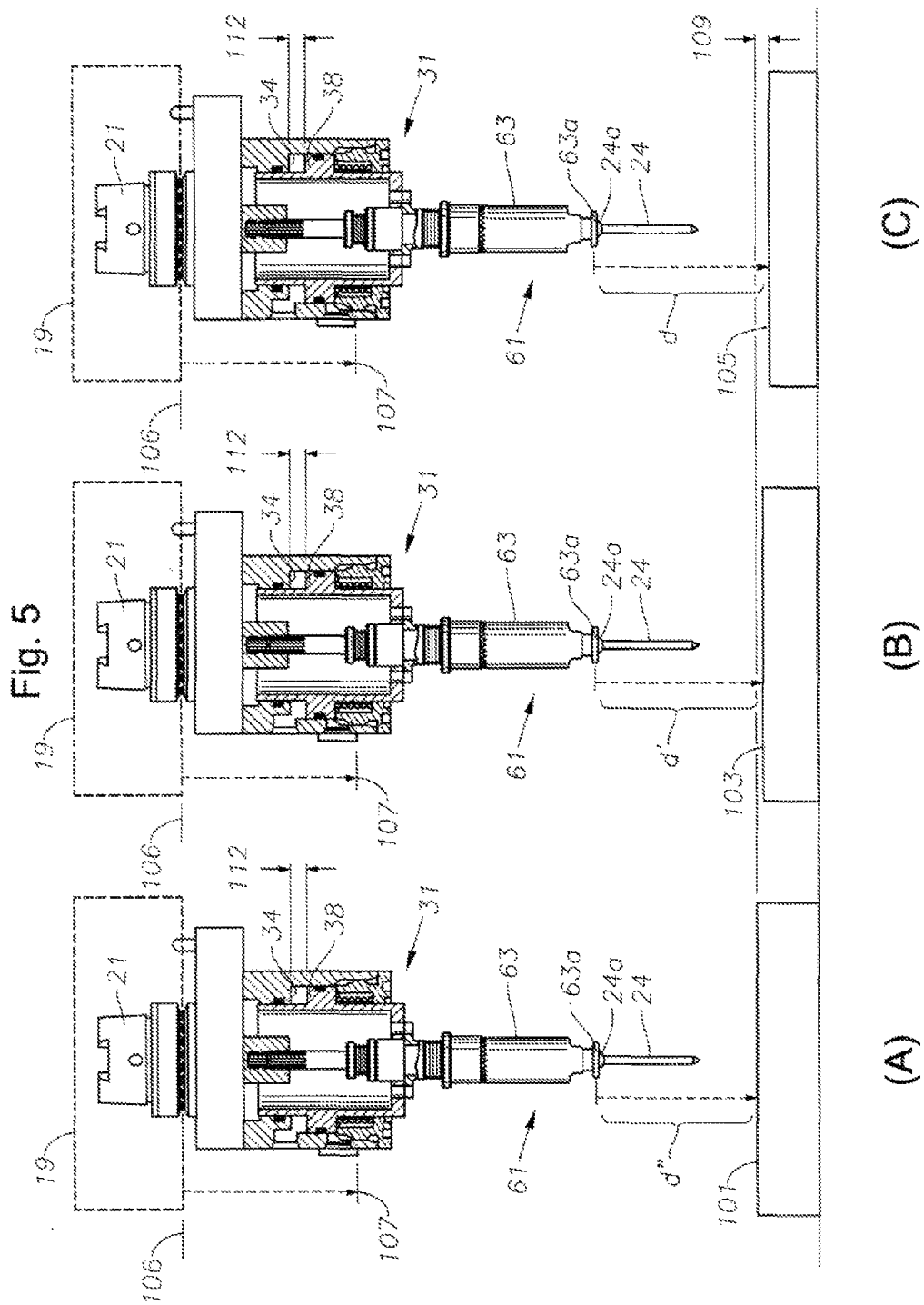

LINEAR COMPENSATOR TOOL FOR DRILL COUNTERSINKING AND SEAL GROOVE MACHINING

FIELD OF THE INVENTION

This invention relates in general to machining applications, and in particular to a linear compensator tool for drill countersinking and seal groove machining. The linear compensator tool ensures accurate drill countersinking and seal groove machining capabilities without control system feedback.

BACKGROUND OF THE INVENTION

Current fabrication processes for trimming and drilling, and machining fuel seal grooves in composite and metallic aircraft panels utilize standard 3, 4, and 5 axis Numerically Controlled (NC) machine tools. Numerous machines of this type exist at aerospace companies which do not have integrated capabilities for machining operations to achieve specific seal groove widths/depths. Furthermore, these machines typically do not have integrated capabilities for performing drill countersinking operations to achieve specific countersink sizes/depths, and are relegated to drill-only operations which do not require specific depth control.

NC machines required to perform these types of processes are forced to integrate a complicated, expensive, and time consuming process of measuring and recording surface profile variations prior to actual machining and drilling. These recorded part surface variations are then used to adjust, or offset, the NC program to account for the deviations from the engineered nominal surface. NC Machines outfitted with the capability to perform these types of processes are substantially more expensive and complicated due to the added components and control hardware and software to operate the system. The lack of viable low-cost drill countersinking tools forces companies to convert these machines into accurate drill countersinking machines with expensive modifications and/or total machine replacement. This situation is prevalent throughout the aircraft industry, both in the commercial and military sectors.

Numerous machines exist today in production throughout the world without the capability to accurately machine seal grooves and drill countersink without substantial additional processes to accommodate the variations seen in composite and/or metallic panels, including surface profile variations. Numerically Controlled machines are programmed to move to a specific point in space without regard to where the actual part might be located. It is assumed that the part is located within a specific tolerance within the machine's work cell to achieve the desired level of accuracy during processing. Very small variations in machine accuracy and part location (i.e., as small as 0.001"—smaller than the thickness of a human hair) will result in seal groove widths and depths, and countersink diameters out of tolerance.

The primary issues with accurate seal groove machining and drill countersinking of composite or metallic parts is knowing or being able to reference the part's surface profile that will be machined, or the part's surface that will be drilled. All seal grooves and countersinks are referenced by this surface. There is currently no Commercial-Off-The-Shelf (COTS) seal groove machining system available in industry which can accurately machine a seal groove to a specified width and depth while adjusting to varying part surface profiles real time without some type of control system feedback or extensive measurement operations to identify the actual part surface profile.

In an expensive and complicated Automated Drilling Machine or Intelligent Drilling System the capability of sensing this surface location is incorporated into the machine and control system. This allows the machine to countersink to a depth relative to the sensed part surface. When the surface is located physically, or by non-contact methods, the drill countersink tool is fed a specific distance into the part relative to that surface to achieve the desired countersink diameter/depth.

Retrofitting existing machines without the specific designed-in countersinking and seal groove machining capabilities is very expensive and results in substantial machine downtime during retrofit. Most NC Machines have no or limited available control lines to die spindle for intelligent drilling systems. Integration costs for intelligent drilling systems are extremely costly and impact machine operations during installation/debugging.

SUMMARY OF THE INVENTION

The drill countersinking and seal groove machining tool proposed in this patent application precludes having to implement substantial changes to the machine and/or additional processes to accommodate an accurate drill countersinking or seal groove machining operation. The functionality of the linear compensator tool allows it to be used like any other standard tool which does not require any interface to the control system or special NC Programming allowances. This tool can be setup and adjusted off-line of the machine, unlike many of the specially designed drill countersinking machines. This tool can be stored as a standard tool in the machine's automated tool storage/retrieval system.

This tool effectively turns an ordinary NC milling machine into an automated drilling machine at a much lower cost and allows the use of existing machines without upgrading or replacing the equipment. This tool effectively turns an ordinary NC milling machine into an accurate seal groove milling machine without the need for elaborate measurements of the part surface profiles.

The seal groove machining and drill countersinking tool incorporates a linear compensator design which applies sufficient force to react to the drilling or seal groove machining process, but not so much force as to distort the work piece being drilled or machined. Additionally, the linear compensator design ensures that the reactant force does not exceed the machine force override allowances. Varying spring rates and/or air pressures on the linear compensator system will accommodate most applications. The tool is designed to absorb over travel of the machining tool, in order to ensure that the surface to be machined is always in contact with the tool. Incorporation of the linear compensator system provides countersinking and seal groove machining capabilities that do not require some form of control system feedback.

The linear compensator design can be adapted to virtually any numerical control machine spindle interface (i.e., HSK Holders, CAT Tapered Holders, etc.) with very minor modifications to the machine. A variety of adjustable micro-stop countersinking and seal groove machining assemblies can be adapted to the linear compensator system, enabling reaction to part surface profile variations and producing an accurate countersink or seal groove real time.

BRIEF DESCRIPTION OF THE DRAWINGS

FIG. 4 is an exploded isometric view of the micro-stop nose piece of FIG. 3.

FIG. 5A is a schematic sectional view of the linear compensator tool of FIG. 2 at the beginning of a machining operation of a maximum thickness panel.

FIG. 5B is a schematic sectional view of the linear compensator tool of FIG. 2 at the beginning of a machining operation of a nominal thickness panel.

FIG. 5C is a schematic sectional view of the linear compensator tool of FIG. 2 at the beginning of a machining operation of a minimum thickness panel.

DETAILED DESCRIPTION OF THE INVENTION

Figure 1:
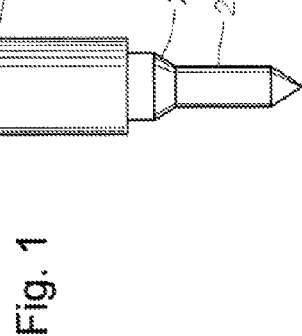
FIG. 1 is a schematic side view of a standard tool holder connected to a NC machine.

Referring to FIG. 1, standard tool holder 21 has a shaft 25 with a splined receptacle capable of receiving and rotating a tool. In this instance, the tool is a countersinking drill bit 24. Tool holder 21 may hold one of a number of machining tools, including a seal groove cutter.

Figure 2:
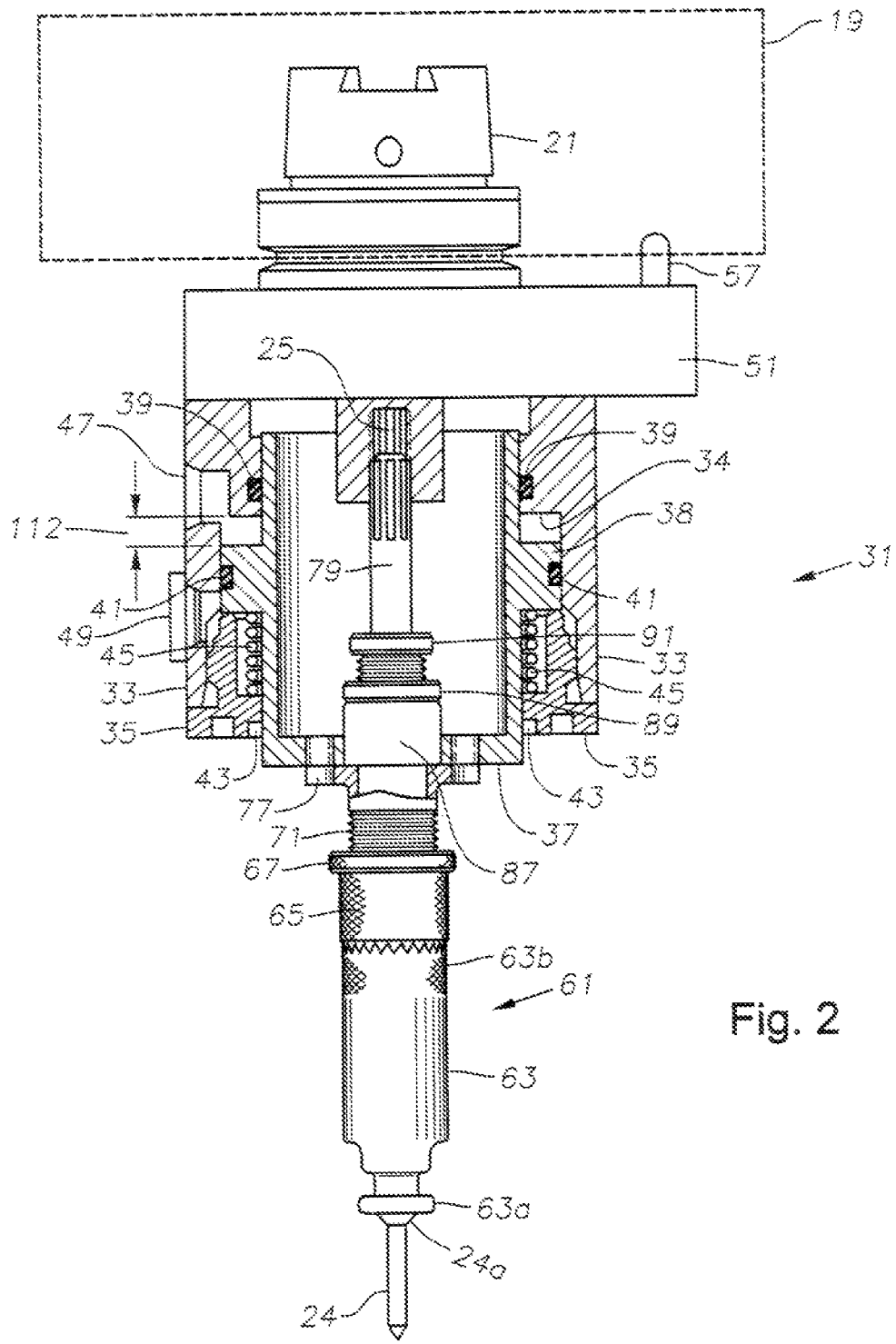
FIG. 2 is a schematic sectional view of a hollow shaft air cylinder linear compensator tool attached to a standard tool holder and NC machine.
Figure 10:
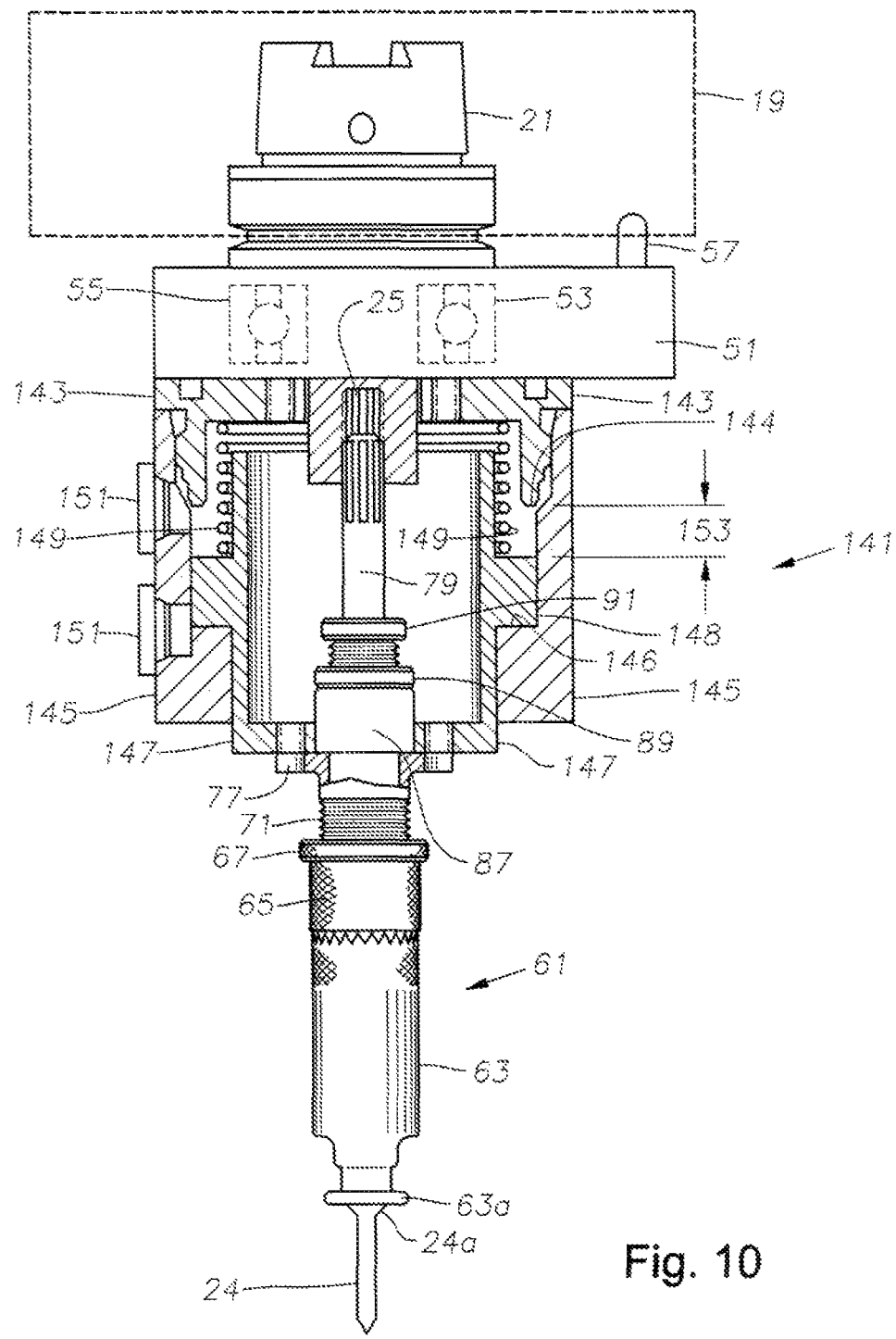
FIG. 10 is a schematic sectional view of a mechanical sleeve with spring linear compensator tool.
Figure 11:
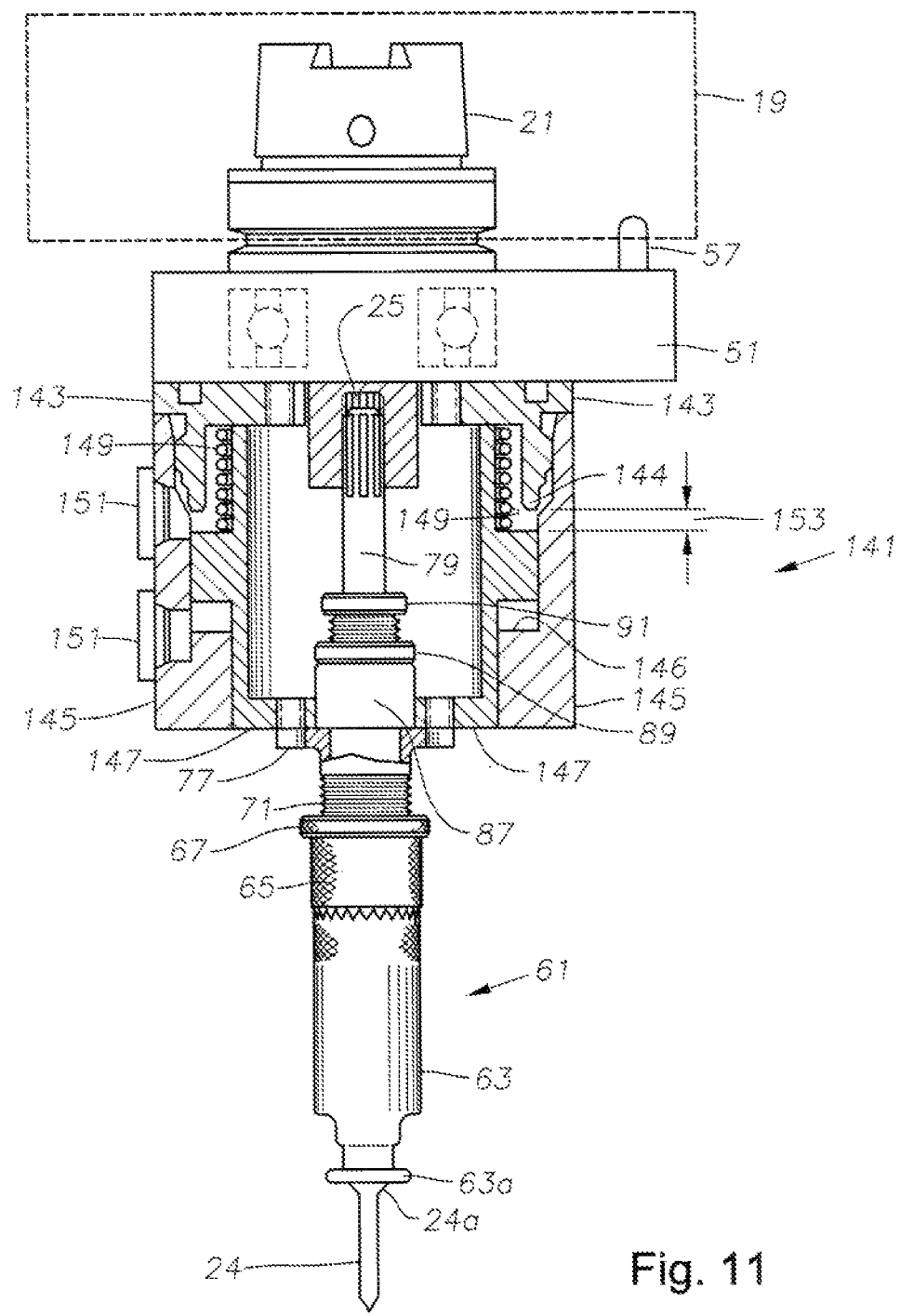
FIG. 11 is a schematic sectional view of the linear compensator tool of FIG. 10 after absorbing over travel.

Referring to FIG. 2, a linear compensator tool (LCT) is connected to a standard tool holder 21 to ensure accuracy in machining processes. The standard tool holder 21 is connected to a spindle of an NC machine 19. The LCT can exist in a number of embodiments including a linear bearing with springs LCT 121 (FIGS. 8 and 9) and a mechanical sleeve with spring LCT 141 (FIGS. 10 and 11). In this example, the LCT is a hollow shaft air cylinder LCT 31. As illustrated by FIG. 2, LCT 31 is connected to tool holder 21 by means of a clocking ring 51 and a bearing (not visible). The bearing (not visible) is connected to clocking ring 51 by means of connector snap 55. The bearing (not visible) and clocking ring 51 are connected to tool holder 21 by means of connector snap 53. Locking pin 57 extends vertically from the top surface of ring 51, and slides into a bushing (not visible) on the face of NC machine 19. Clocking ring 51, the bearing (not visible), and locking pin 57 ensure that the body of LCT 31 is fixed and does not rotate with tool holder 21 and countersinking drill bit 24.

Attached to the bottom of clocking ring 51 is outer casing 33 of LCT 31. Casing 33 is generally cylindrical in shape with the exterior portion of casing 33 being smooth. In an alternate embodiment, casing 33 could take other forms such as a square or rectangle. The interior surface of casing 33 is machined in a manner to enable it to receive inner casing 37. The upper interior surface of casing 33 forms a downward facing shoulder 34.

Inner casing 37, generally cylindrical in shape, slidingly engages outer casing 33. In an alternate embodiment, casing 37 could take other forms such as a square or rectangle. The outer surface of casing 37 forms a flange section 38. Flange section 38 and shoulder 34 limit the movement of casing 37 within casing 33. O-ring seals 39, 41 ensure that the contact surfaces between outer casing 33 and inner casing 37 are properly sealed. A cap 35 is placed around inner casing 37, on the bottom of LCT 31, and is secured to outer casing 33. Cap 35 is generally circular in shape and has a T-shaped cross section that produces a small annulus between inner casing 37 and cap 35. O-ring seal 43 ensures that the contacting surfaces between inner casing 37 and cap 35 are sealed. Inner casing 37 is free to telescope in and out of casing 33, but is limited in range by cap 35 and shoulder 34.

A spring 45 surrounds inner casing 37, and is located in the annulus between inner casing 37 and cap 35. Spring 45 acts to compress inner casing 37 as far as possible towards clocking ring 51. Air ports 47, 49 are located in outer casing 33. Port 47 is connected to a compressed air line, whereas port 49 is open to the atmosphere.

Figure 3:
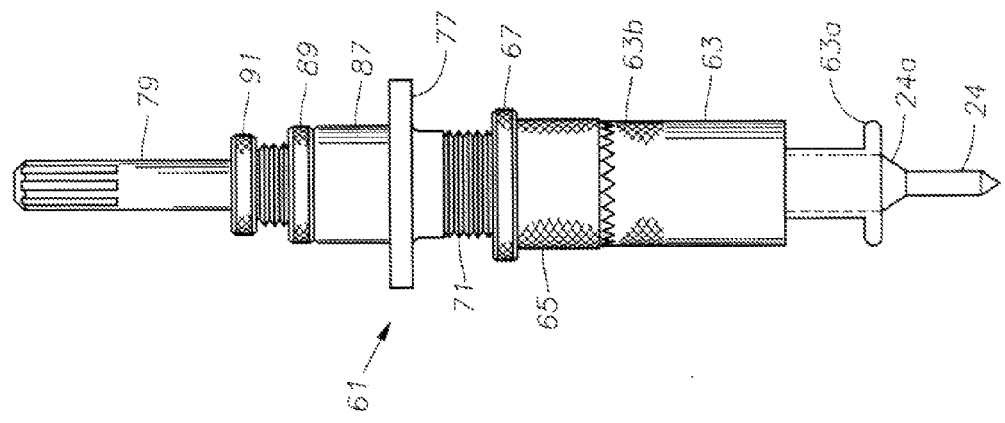
FIG. 3 is a schematic side view of a micro-stop nose piece.

Micro-stop nose piece 61 is attached to the bottom of inner casing 37 by way of mounting flange 77. As illustrated by FIGS. 3 and 4, micro-stop nose piece 61 is comprised of various components. These components include nose piece 63, locking collar 65, locking ring 67, threaded fixture 69, shaft 79, and tool casing 85. Locking ring 67 is threaded, and is screwed on to threads 71 on fixture 69. Locking collar 65 slides onto fixture 69, and is positioned around threads 71. A pin (hot visible) is located on the inner surface of collar 65, and slides into slot 75 on fixture 69. The pin (not visible), captured in slot 75, ensures that collar 65 can not rotate around fixture 69. One end of collar 65 is saw tooth patterned. Nose piece 63 is threaded on one end 63*b*, and is screwed onto the threads 73 on fixture 69. End 63*b* of nose piece 63 has teeth that align with the teeth on collar 65, preventing rotation of nose piece 63. End 63*a* of nose piece 63 has an aperture that extends from the main body of the nose piece 63, and allows a machining tool to pass through the aperture, forming a shoulder.

One end of shaft 79 is splined, and the other extends through fixture 69, where tool collar 85 surrounds it. Just above collar 85, a thrust bearing 83 is placed on shaft 79. Pinned collar 81, located just above bearing 83, holds bearing 83 in place on shaft 79. The shaft assembly is inserted into nose piece fixture 69. Section 87 of the nose piece assembly 61 contains a close tolerance pilot that controls the center line of shaft 79. Just above section 87 is a locking ring 89 which locks the pilot in place. Just above the locking ring 89 is another locking ring 91 which locks shaft 79 into the micro-stop nose piece assembly 61. Once mounted to inner casing 37, the splined end of shaft 79 is connected to the tool holder shaft hub 25. Shaft 79 can move axially within LCT 31 due to the splined end and hub.

As illustrated by FIGS. 5A, 5B, and 5C, hollow shaft air cylinder LCT 31 is connected to a standard tool holder 21 for countersinking. Standard tool holder 21 is connected to a spindle of NC machine 19. LCT 31 is connected to tool holder 21 as previously discussed.

A countersinking drill bit 24 is inserted into the micro stop nose piece assembly 61. Bit 24 has a counterbore portion 24a at its upper end that extends below end 63a of nose piece 63. Referring back to FIGS. 3 and 4, nose piece 63 is adjusted to ensure the desired countersink depth. The desired depth is determined by the extent that bit 24, and in particular counterbore portion 24a extends below the aperture on end 63a of nose piece 63. Nose piece 63 is adjusted by screwing ring 67 toward connector flange 77. Locking collar 65 is then free to move up or down on fixture 69. Nose piece 63 is then rotated on threads 73 in order to control the extent that counterbore portion 24a of bit 24 extends below end 63a. Once the desired depth is set, locking collar 65 is positioned to lockingly engage the teeth on end 63b of nose piece 63. Locking ring 67 is then tightened securely against collar 65, locking the nose piece 63 in position and ensuring the desired drill depth of bit 24.

NC machine 19 is programmed to lower tool holder 21 from a starting point 106 to a point 107 based on the thickness of the minimum thickness panel 105. Programming will ensure that counterbore portion 24a of bit 24 cuts to the proper depth of the panel regardless of whether the panel is one of maximum thickness 101, nominal thickness 103, or minimum thickness 105. Typical variations in panel thickness are illustrated by 109, and in one embodiment, may be less than 0.020 inches.

The programmed point 107 is the same point in space regardless of the thickness of panels 101, 103, 105. Programmed point 107 is determined by measuring the amount of travel it takes for end 24a to form the counterbore in minimum thickness panel 105 to the correct depth. The travel of tool holder 21 to point 107 should equal the distance d in FIG. 5C. The traveled distance of tool holder 21 to point 107 will be slightly greater than the distance d'; which is the distance counterbore end 24a travels to cut the counterbore to the proper depth in medium thickness panel 103 (FIG. 5B). The traveled distance of LCT 31 to point 107 will be even greater than the distance d", which is the distance counterbore end 24a travels to cut the counterbore to the proper depth in maximum thickness panel 101 (FIG. 5A).

Figure 7:
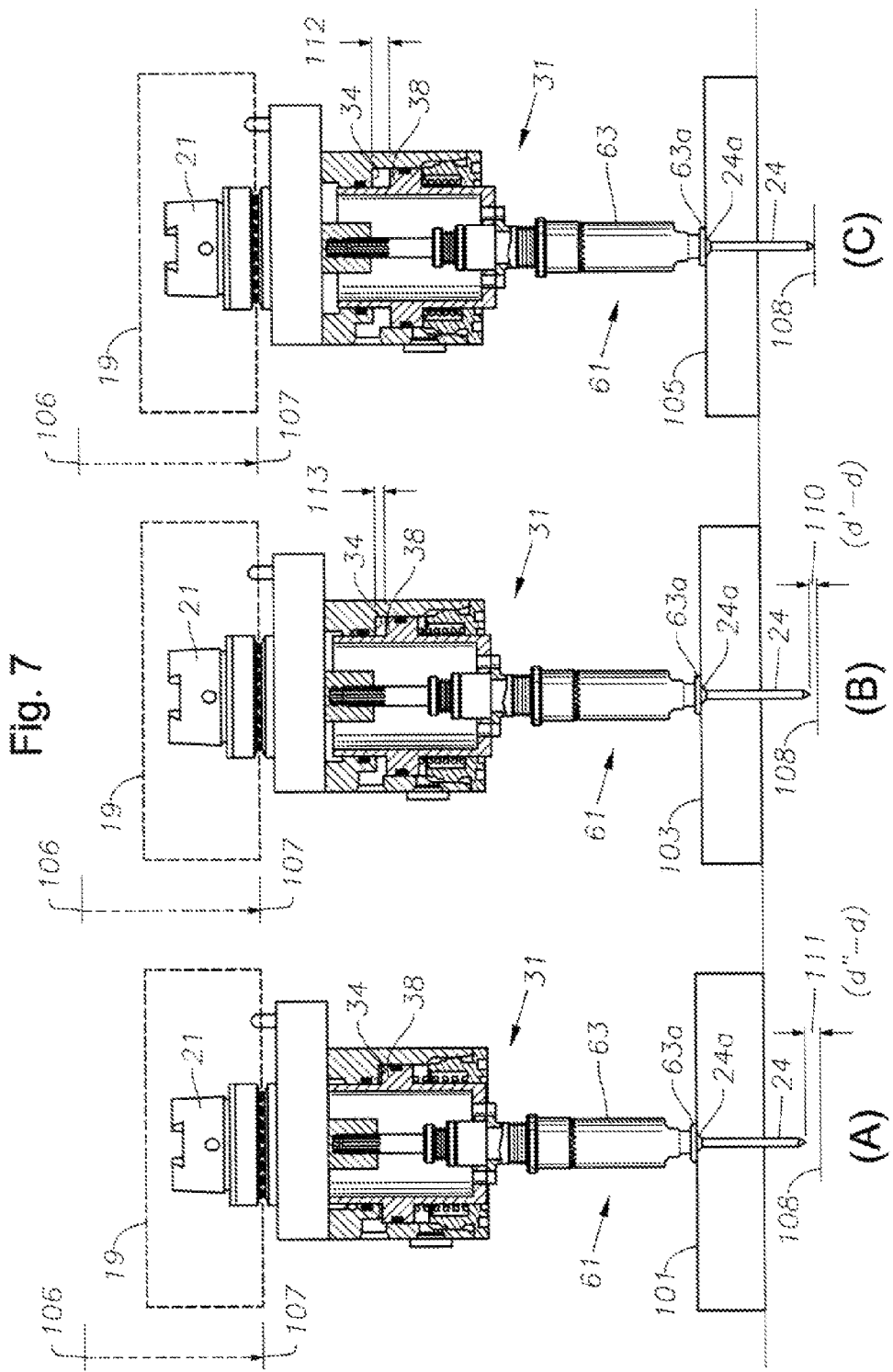
FIG. 7A is a schematic sectional view of the linear compensator tool of FIG. 2 after drill countersinking a maximum thickness panel.
FIG. 7B is a schematic sectional view of the linear compensator tool of FIG. 2 after drill countersinking a nominal thickness panel.
FIG. 7C is a schematic sectional view of the linear compensator tool of FIG. 2 after drill countersinking a minimum thickness panel.

Referring back to FIG. 2, pressure is supplied to LCT 31 by an air source (not shown), which pumps air into LCT 31. Air enters LCT 31 through port 47 and fills the annulus between outer casing 33 and inner casing 37. As LCT 31 is pressurized, inner casing 37 fully extends outwards from casing 33. As inner casing 37 extends outwards from casing 33, port 49 ensures that any air trapped below flange 38 in the annulus between casing 37 and casing 33 is vented to the atmosphere. When casing 37 is fully extended, a gap 112 exists between shoulder 34 and flange 38. Gap 112 is designed to absorb over travel of tool holder 21, and in one embodiment, gap 112 is designed to absorb up to 0.100 inches of over travel. The air pressure is sufficient so that drill bit 24 will not cause shoulder 34 to move toward flange 38 as it drills. However, when nose piece end 63a contacts the surface of one of the panels 101, 103, 105 it will stop downward travel of flange 38 (FIG. 7).

As illustrated by FIGS. 5A, 5B, and 5C, the tool holder 21 starts at the same elevation 106 and ends at the same elevation 107. NC machine 19 rotates countersinking drill bit 24 and begins lowering tool holder 21 and bit 24 toward programmed point 107. Given the different thicknesses of panels 101, 103, 105, tool holder 21 is at a different distance from the panel depending on the panel thickness.

Figure 6:
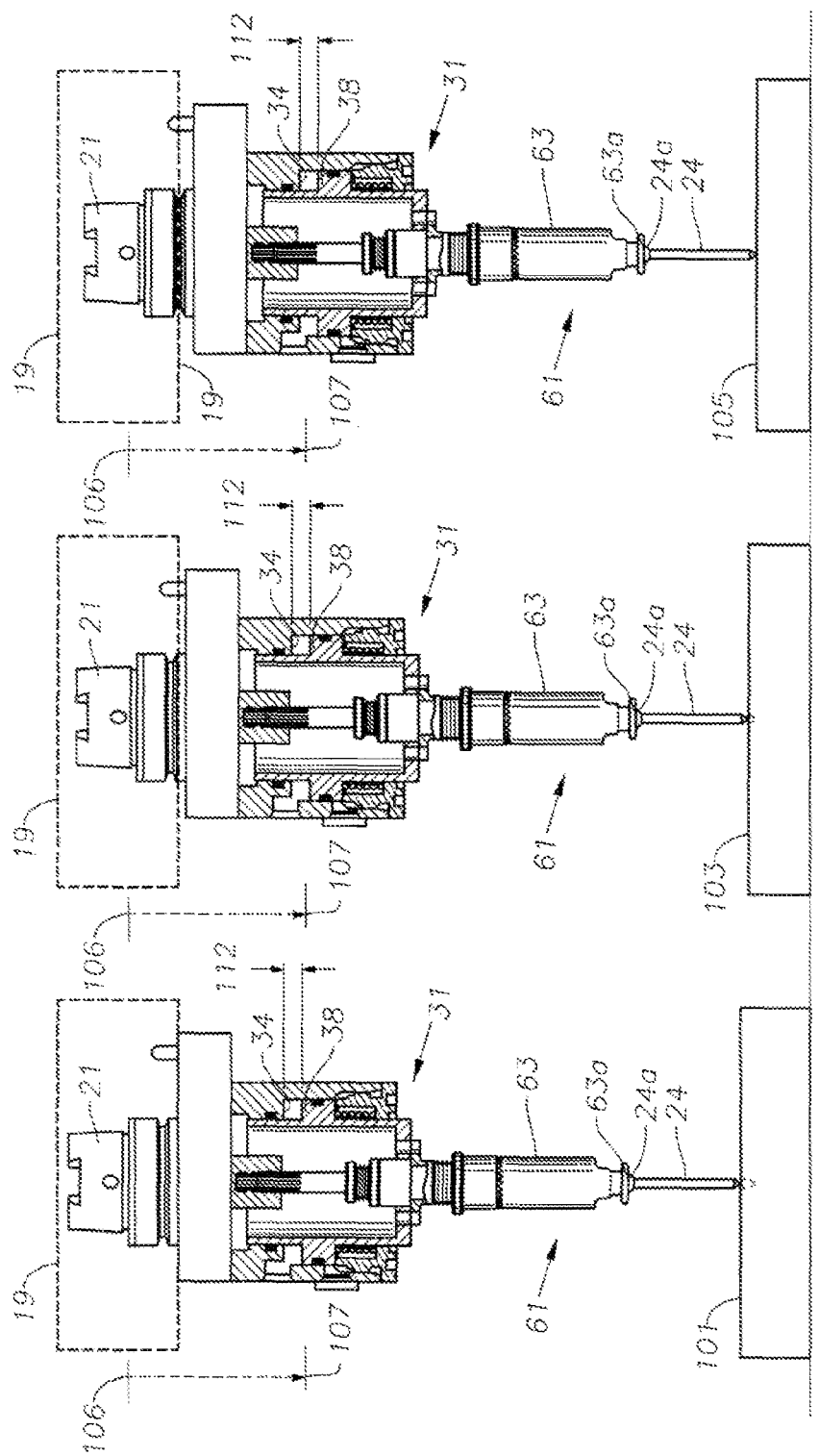
FIG. 6A is a schematic sectional view of the linear compensator tool of FIG. 2 when first contacting the maximum thickness panel.
FIG. 6B is a schematic sectional view of the linear compensator tool of FIG. 2 when first contacting the nominal thickness panel.
FIG. 6C is a schematic sectional view of the linear compensator tool of FIG. 2 when first contacting the minimum thickness panel.

Considering minimum thickness panel 105, when bit 24 first contacts panel 105, the pressure of LCT 31 is such that bit 24 will penetrate the panel surface and continue toward the desired point 107 without any change in the position of flange 38, as illustrated by FIG. 6C. As NC machine 19 continues to lower tool holder 21, bit 24 rotates and continues downwards until it has penetrated the panel and drill bit counterbore portion 24a has eat the proper counterbore depth in panel 105. The pressure of LCT 31 is regulated such that the once the shoulder on end 63a contacts the panel surface, the force acting upwards against nose piece 63 is greater than the force acting downwards on inner casing 37. However, when machining the minimum thickness panel 105, end 63a contacts the surface when tool holder 21 is at point 107, as illustrated by FIG. 7C. The NC machine 19 stops drilling once tool holder 21 has reached point 107.

Considering nominal thickness panel 103, bit 24 starts drilling sooner than with panel 105 because it contacts panel 103 at a lesser distance d'. The pressure of LCT 31 is such that bit 24 will penetrate the panel surface and continue toward the desired point 107 without any change in the position of flange 38, as illustrated by FIG. 6B. When nose piece 63a contacts panel 103, tool holder 21 is not yet at point 107. The resistance of nosepiece 63a overcomes the air pressure, causing shoulder 34 to advance toward flange 38. As shoulder 34 advances toward flange 38, shaft 79 advances further into receptacle 25 (FIG. 2). Drill bit 24 does not move further downward, however, as it has fully cut the counterbore and nosepiece 63a prevents further downward movement.

For maximum thickness panel 101, the same occurs as with nominal thickness panel 103. Bit 24 starts drilling sooner than with panels 105, 103 because it contacts panel 101 at a lesser distance d". The pressure of LCT 31 is such that bit 24 will penetrate the panel surface and continue toward the desired point 107 without any change in the position of flange 38, as illustrated by FIG. 6A. Drill bit counterbore 24a will have cut to the full depth before LCT 31 has reached point 107. As LCT 31 moves further downward, nosepiece 63a prevents further downward movement of drill bit portion 24a, causing shoulder 34 to advance toward flange 38. As shoulder 34 advances toward flange 38, shaft 79 advances further into receptacle 25 (FIG. 2).

As illustrated by FIGS. 7A, 7B, and 7C, LCT 31 continues downward until reaching point 107. The amount of over travel absorbed by LCT 31 varies with the panel thickness. As illustrated by FIG. 7C, when drilling a panel of minimum thickness 105, LCT 31 absorbs the least amount or no over travel. Due to the thickness of panel 105, the shoulder formed by the aperture on end 63b of nose piece 63 contacts the panel surface when tool holder 21 reaches point 107, which is programmed for the minimum thickness panel 105. In one example, there is no over travel to be absorbed. Accordingly, at the end of the machining operation, the original gap 112 between flange 38 and shoulder 34 remains.

As illustrated by FIG. 7B, when drilling a panel of nominal thickness 103, LCT 31 absorbs over travel. Due to the thickness of panel 103, the shoulder formed by the aperture on end 63b of nose piece 63 contacts the panel surface before tool holder 21 reaches point 107, which is programmed for the minimum thickness panel 105. As a result, LCT 31 must absorb the over travel distance 110, which is equal to the difference between d' and d (FIGS. 5B and 5C). In one example, shoulder 34 has advanced towards flange 38, leaving a gap 113.

Referring to FIG. 7A, when drilling a panel of maximum thickness 101, LCT 31 absorbs the greatest amount of over travel. Due to the thickness of panel 101, the shoulder formed by the aperture on end 63b of nose piece 63 contacts the panel surface before tool holder 21 reaches point 107, which is programmed for the minimum thickness panel 105. As a result, LCT 31 must absorb the over travel distance 111, which is equal to the difference between d" and d (FIGS. 5A and 5C). In one example, the over travel distance 111 is equal to original distance 112 that LCT 31 was designed to absorb. Accordingly, when tool holder 21 reaches point 107, flange 38 is in contact with shoulder 34.

LCT 31 operates as previously discussed when connected to a standard tool holder 21 for seal groove machining. The only change in regard to the operation of LCT 31 when seal groove machining is countersinking drill bit 24 is replaced with a seal groove cutting tool. As explained above, the gap between flange 38 and shoulder 34 allows LCT 31 to absorb over-travel by the tool holder, which guarantees nosepiece 63 contacts the panel surface resulting in a consistent seal groove width/depth regardless of the panel thickness. The variations in panel thickness illustrated above may be present over the surface profile of a single panel sought to be machined. During the seal groove machining process, LCT 31 responds to variations in the surface profile of a panel by compressing (absorbing over travel) or extending depending on the panel thickness at a given point.

Figure 8:
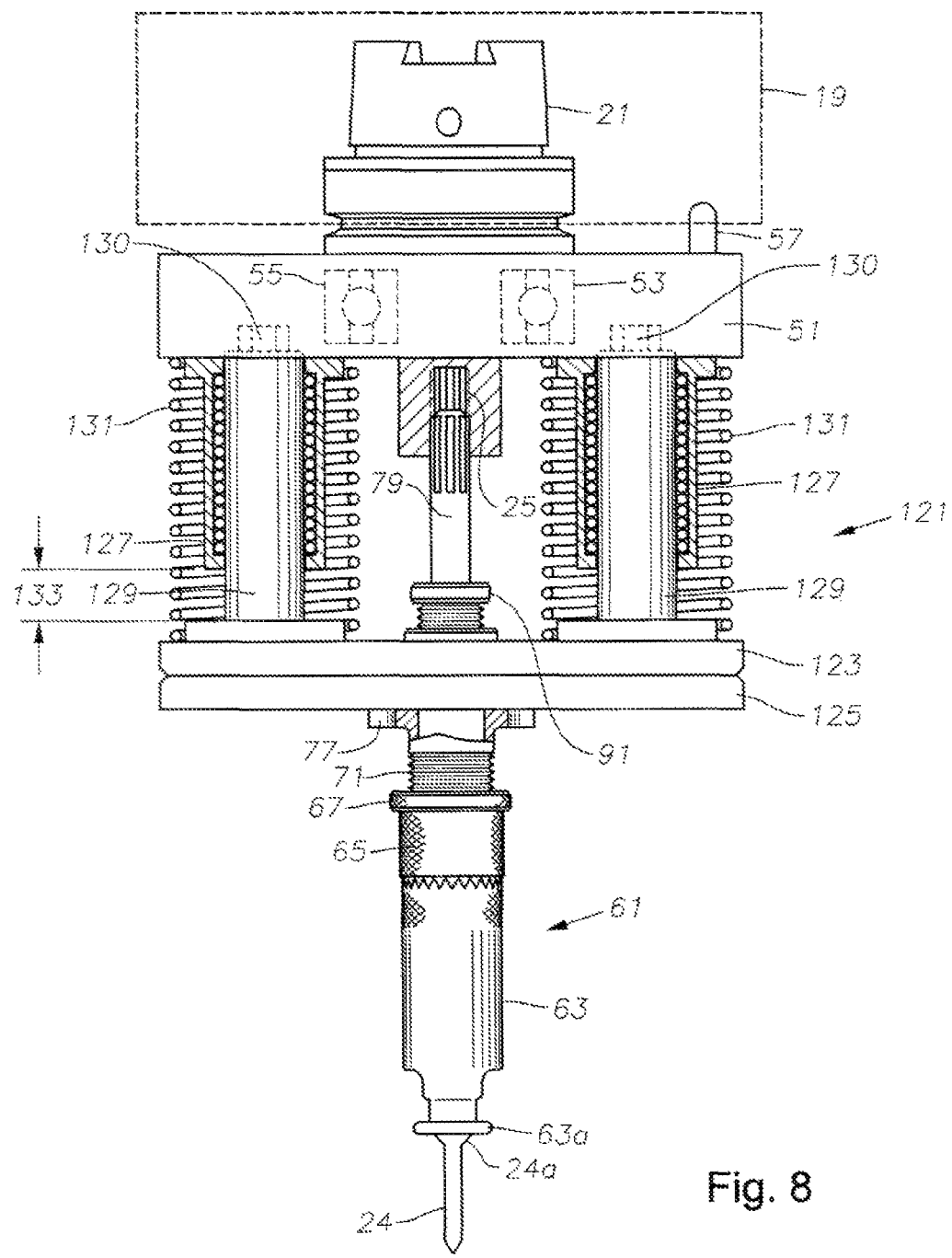
FIG. 8 is a schematic sectional view of a linear bearings with springs linear compensator tool.
Figure 9:
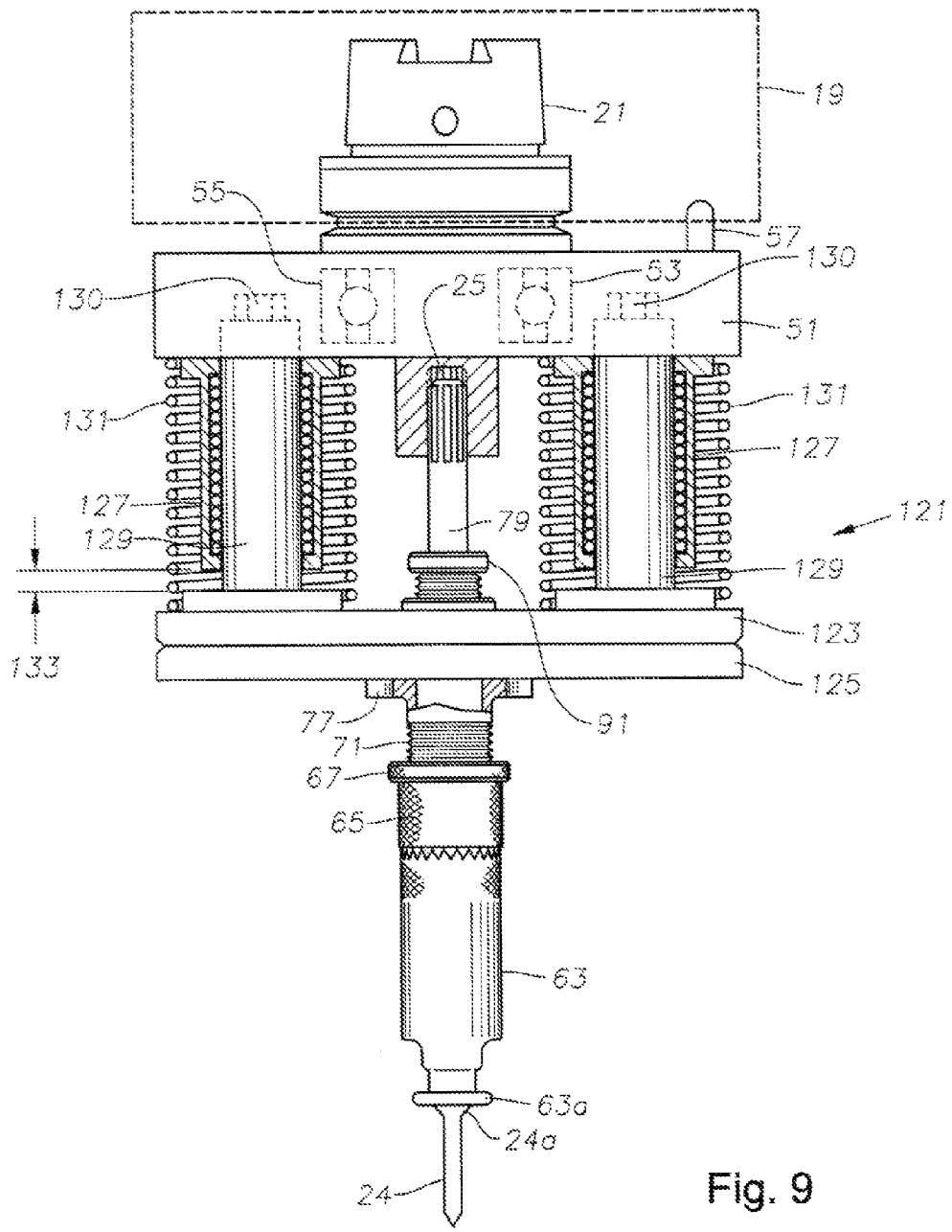
FIG. 9 is a schematic sectional view of the linear compensator tool of FIG. 8 after absorbing over travel.

Referring to FIGS. 8 and 9, an alternate embodiment LCT is illustrated in the form of linear bearings with spring LCT 121. LCT 121 is connected to tool holder 21 by means of clocking ring 51 and a bearing (not visible). Bearing (not visible) is connected to clocking ring 51 by means of connector snap 55. Bearing (not visible) and clocking ring 51 are connected to tool holder 21 by means of connector snap 53. Locking pin 57 extends vertically from the top face of ring 51, and slides into abashing (not visible) on the face of the NC machine. Clocking ring 51, bearing (not visible), and locking pin 57 ensure that the body of LCT 121 is fixed and does not rotate with tool holder 21 and drill countersinking bit 24.

A plurality of flanged linear bearings 127 are attached to the bottom of clocking ring 51. Bearings 127 extend downward towards mounting plate 123. Mounting plate 123 is circular in shape, but in an alternate embodiment could take other forms such as a square or rectangle. A rod 129 travels through each linear bearing 127 and extends downward before connecting to mounting plate 123. Locking nuts 130 are attached to the end of rods 129 opposite mounting plate 123. Nuts 130 ensure that rods 129 are fixed between clocking ring 51 and mounting plate 123. Rods 129 can move axially in linear bearings 127, but are limited in range of movement due to nut 130 on one end and linear bearing 127 on the other.

Surrounding each rod 129 and linear bearing 127 is a spring 131, which is connected between clocking ring 51 and mounting plate 123. Spring 131 acts to ensure that LCT 121 is fully extended in its natural state, ensuring a maximum gap between clocking ring 51 and mounting plate 123. Plate 125 is connected to the bottom of mounting plate 123.

Micro-stop nose piece 61 is attached to the bottom of plate 125 by way of mounting flange 77. Once micro-stop nose piece assembly 61 is mounted to plate 125, the splined end of shaft 79 is connected to tool holder shaft hub 25. Shaft 79 can move axially within LCT 121 due to the splined end and hub.

Linear bearings with spring LCT 121 performs just as LCT 31. FIG. 8 illustrates LCT 121 in a natural state, prior to contacting a workpiece. Gap 133 between linear bearings 127 and mounting plate 123 is the largest when plate 123 is fully extended. FIG. 9 illustrates LCT 121 absorbing over travel, as indicated by the decreased size of gap 133.

Referring to FIGS. 10 and 11, an alternate embodiment LCT is illustrated in the form of spring actuated cylinder LCT 141. LCT 141 is connected to tool holder 21 by means of clocking ring 51 and a bearing (not visible). Bearing (not visible) is connected to clocking ring 51 by means of connector snap 55. Bearing (not visible) and clocking ring 51 arc connected to tool holder 21 by means of connector snap 53. Locking pin 57 extends vertically from the top face of ring 51, and slides into a bushing (not visible) on the lace of the NC machine. Clocking ring 51, bearing (not visible), and locking pin 57 ensure that the body of LCT 141 is fixed and does not rotate with tool holder 21 and drill countersinking bit 24.

Attached to the bottom of clocking ring 51 is mounting plate 143. Mounting plate 143 is generally cylindrical and flat, with a T-shaped cross section 144 on each side. Outer casing 145 is machined to slide over and connect securely to mounting plate 143 of LCT 141. Casing 145 is generally cylindrical in shape with the exterior portion of casing 145 being smooth. In an alternate embodiment, casing 145 could take other forms such as a square or rectangle. The interior surface of casing 145 is machined in a manner to enable it to receive inner casing 147. The lower interior surface of casing 145 forms an upward facing shoulder 146.

Inner casing 147, generally cylindrical in shape, slidingly engages outer casing 145. In an alternate embodiment, casing 147 could take other forms such as a square or rectangle. The outer surface of casing 147 forms a flange section 148. Flange section 148 of casing 147, shoulder 146 of casing 145, and T-cross section 544 of plate 143 limit the movement of casing 147 within casing 145. Plate 143, outer casing 145, and inner casing 147 are machined to connect to one another with extremely close tolerances to form a mechanical sleeve. A small annulus if formed between the inner casing 147 and T-shaped cross section 144 of plate 143. Inner casing 147 is free to telescope in and out of casing 145, but is limited in range by section 144 of plate 143 and shoulder 146 of outer casing 145.

A spring 149 surrounds inner casing 147, and is located in the annulus between inner casing 147 and outer casing 145. Spring 149 acts to ensure that LCT 141 is fully extended in its natural state, ensuring a maximum gap between flange 148 and T-section 144. Air ports 151 are located on the exterior of outer casing 145. Airports 151 are open to the atmosphere and ensure that LCT 141 does not become pressurized with the telescoping movement of inner casing 147.

Micro-stop nose piece 61 is attached to the bottom of inner casing 147 by way of mounting flange 77. Once micro-stop nose piece assembly 61 is mounted to casing 147, the splined end of shaft 79 is connected to the tool holder shaft hub 25. Shaft 79 can move axially within LCT 141 due to the splined end and hub.

Spring actuated cylinder LCT 141 performs just as LCT 31 and LCT 121. FIG. 10 illustrates LCT 141 in a natural state prior to contacting a workpiece. Gap 153, between flange 148 and T-section 144 is the largest when casing 147 is fully extended. FIG. 11 illustrates LCT 141 absorbing over travel, as indicated by the decreased size of gap 153.

While the invention has been shown in only one of its forms, it should be apparent to those skilled in the art that it is not so limited but is susceptible to various changes without departing from the scope of the Invention. For example, linear compensator tool could be used in a number of various machining applications requiring material surface accuracy.

The invention claimed is:

1. A linear compensator tool for attachment to a machining apparatus having a rotatably driven spindle that can be advanced along an axis to a selected point in space comprising:

a compensator member with first and second ends, the first end having a coupling for mounting to the spindle for axial movement therewith, the compensator member being mounted to the machining apparatus for non rotation with the spindle;

a nose piece having a bore with an axis into which a machining tool is inserted and retained, the nose piece being mounted to the second end for axial movement of the compensator member relative to the nose piece between first and second positions, the nose piece being non rotatable relative to the compensator member;

a shaft carried by the coupling for rotation in unison with the spindle whenever the spindle is rotating, the shaft being configured to carry a machining tool that extends through the nose piece for performing a machining operation on the workpiece;

a bias member mounted between first and second ends that urges the compensator member toward the first position; and a stop member non rotatably carried by the nose piece for contacting the surface of the workpiece and preventing further movement of the nose piece and the second end toward the workpiece, so that if the contact occurs before the spindle reaches the selected point in space, continued axial movement of the compensator member toward the point in space causes the compensator member to overcome the bias member and move from the first position toward the second position.

2. The linear compensator tool of claim 1 wherein the bias member is a spring.

3. The linear compensator tool of claim 1 wherein the bias member is a pressurized air chamber.

4. The linear compensator tool of claim 1 wherein the bias member is a pressurized fluid chamber.

5. The linear compensator tool of claim 1 wherein the compensator member further comprises: an outer casing, connected to and axially extending from the coupling; and an inner casing axially disposed within the outer casing and capable of limited axial movement.

6. The linear compensator tool of claim 1 wherein the compensator member further comprises: an upper plate, connected to and axially extending from the coupling; and a lower plate, connected to the upper plate by at least one linear bearing and capable of limited axial movement.

7. The linear compensator tool of claim 1, wherein the nose piece comprises:
   an upper tubular member having external threads;
   a collar having teeth on a lower end, the collar being non-rotatably carried on the upper tubular member for axial movement;
   a lower member having internal threads that engage the external threads on the upper tubular member, the lower member having teeth on an upper end that engage the teeth of the collar to prevent rotation of the lower member relative to the collar, the stop member being located on a lower end of the lower member; and
   a lock member having internal threads that engage the external threads, the lock member bearing against an upper end of the collar to maintain the teeth in engagement with each other.

8. The linear compensator tool of claim 1, wherein the stop member is fixed to the nose piece for axial movement therewith, and the shaft assembly is configured to cause the machining tool to protrude a constant distance past the stop member while the second end is moving toward the second position.

9. A linear compensator tool for connection with a machining apparatus capable of repeatedly moving a spindle in a direction toward a workpiece to a fixed point in space, the linear compensator tool comprising:
   a tool holder for connecting the compensator tool to the spindle of the machining apparatus;
   an outer casing connected to and axially extending from the tool holder;
   an inner casing axially disposed within the outer casing and capable of limited axial movement relative to the outer casing between an extended and a contracted position;
   a bias member located between the inner casing and outer casing for biasing the inner casing toward extended position relative to the outer casing;
   a nose piece connected to and axially extending from the inner casing for axial movement in unison with the inner casing relative to the outer casing;
   a shaft assembly mounted to the tool holder for rotation in unison with the spindle at all times the spindle is rotating and extending through the outer casing, the inner casing and into the nose piece;
   a clocking ring cooperatively associated with the tool holder and the inner and outer casings for preventing rotation of the inner and outer casings and the nose piece with the spindle and the shaft;
   a stop member on an end of the nose piece for contacting a surface of the workpiece and preventing further movement of the nose piece toward the workpiece;
   a machining tool connected to the shaft assembly for rotation therewith relative to the inner and outer casings and the nose piece and extending axially from the stop member; and
   wherein if the stop member contacts the surface of the workpiece prior to the machining apparatus moving the spindle to the fixed point in space, continued movement of the machining apparatus toward the fixed point in space causes the inner casing to move toward the contracted position while the machining tool continues to protrude past the stop member a constant distance.

10. The linear compensator tool of claim 9 further comprising:
    a pressure port located on and extending through the outer casing for pressurizing an annulus with air between the inner casing and the outer casing;
    a downward facing shoulder on the interior surface of the outer casing; and
    a flange section on the exterior surface of the inner casing, for limiting the axial movement of the inner casing within the outer casing.

11. The linear compensator tool of claim 9, wherein the shaft assembly comprises an upper portion fixed axially to the outer casing and a lower portion fixed axially to the inner casing, the upper and lower portions of the shaft assembly being axially movable relative to each other while the inner casing is moving toward the contracted position.

12. The linear compensator tool of claim 9, wherein the nose piece comprises:
    an upper tubular member having external threads;
    a collar having teeth on a lower end, the collar being non-rotatably carried on the upper tubular member for axial movement;
    a lower member having internal threads that engage the external threads on the upper tubular member, the lower member having teeth on an upper end that engage the teeth of the collar to prevent rotation of the lower member relative to the collar, the stop member being located on a lower end of the lower member; and a lock member having internal threads that engage the external threads, the lock member bearing against an upper end of the collar to maintain the teeth in engagement with each other.

13. A method of machining a workpiece with a machining apparatus comprising:
   (a) mounting a nose piece with a stop member to a compensator member with first and second ends, the compensator member being capable of movement relative to the nosepiece between first and second positions, and the stop member carried by the nose piece for contacting the surface of a work piece;
   (b) determining a point in space for advancing a spindle of the machining apparatus to complete a machining operation on a workpiece having a surface profile a selected maximum distance from the point in space;
   (c) mounting the compensator member to the spindle of the machining apparatus;
   (d) inserting a machining tool into the nose piece;
   (e) urging the compensator member to the first position by introducing fluid between the first and second ends of the compensator member;
   (f) rotating the tool, moving the spindle toward the point in space, and thereby moving the tool into the workpiece;
   (g) engaging the stop member with the surface of the workpiece;
   (h) if the point in space has not yet been reached by the spindle when the stop member engages the surface profile of the workpiece due to the surface profile of the workpiece being closer to the point in space than the maximum distance, continuing movement of the spindle toward the point in space and the compensator member toward the workpiece while the nose piece and the machining tool are prevented by the stop member from further axial movement, thereby causing the compensator member to move from the first position toward the second position; and
   (i) in step (h) if the point in space is reached simultaneously with the stop member engaging the surface profile of the workpiece, immediately stopping further movement of the compensator member toward the workpiece.

14. The method of claim 13, wherein step (c) comprises mounting the compensator member to the spindle for non rotation with the spindle.

15. The method according to claim 13 wherein step (e) further comprises urging the compensator member to the first position by placing a spring between the first and second ends of the compensator member.

* * * * *